(12) United States Patent
Sakata et al.

(10) Patent No.: US 11,316,331 B2
(45) Date of Patent: Apr. 26, 2022

(54) SENSOR ATTACHMENT BRACKET AND LEAD LINE ROUTING STRUCTURE

(71) Applicant: DENSO CORPORATION, Kariya (JP)

(72) Inventors: Toshihiro Sakata, Kariya (JP); Manabu Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 503 days.

(21) Appl. No.: 16/482,359

(22) PCT Filed: Mar. 16, 2018

(86) PCT No.: PCT/JP2018/010647
§ 371 (c)(1),
(2) Date: Jul. 31, 2019

(87) PCT Pub. No.: WO2018/173980
PCT Pub. Date: Sep. 27, 2018

(65) Prior Publication Data
US 2020/0270929 A1    Aug. 27, 2020

(30) Foreign Application Priority Data

Mar. 23, 2017    (JP) .............................. JP2017-057931

(51) Int. Cl.
*E05F 15/40*      (2015.01)
*B60R 16/02*      (2006.01)
*H02G 3/32*       (2006.01)
*H02G 3/30*       (2006.01)

(52) U.S. Cl.
CPC ........... *H02G 3/30* (2013.01); *B60R 16/0215* (2013.01); *E05F 15/40* (2015.01); *H02G 3/32* (2013.01)

(58) Field of Classification Search
CPC ........ B60J 5/00; B60J 5/10; B60J 5/101–104; B60J 5/107; B60R 16/0215; E05F 15/40; E05F 15/42; E05F 15/44; E05F 15/46; E05Y 2600/40; E05Y 2600/45; E05Y 2900/50; E05Y 2900/531; E05Y 2900/532; H02G 3/30; H02G 3/32
See application file for complete search history.

(56) References Cited

U.S. PATENT DOCUMENTS

| 6,339,305 | B1 * | 1/2002 | Ishihara | E05F 15/44 49/27 |
| 9,371,679 | B2 * | 6/2016 | Sakamaki | E05F 15/44 |
| 2014/0339842 | A1 * | 11/2014 | Kawaguchi | E05F 15/44 296/1.04 |
| 2018/0364387 | A1 * | 12/2018 | Hattori | G01V 3/02 |

FOREIGN PATENT DOCUMENTS

JP    2016-31924 A    3/2016

\* cited by examiner

*Primary Examiner* — Levi Gannon
(74) *Attorney, Agent, or Firm* — Oliff PLC (57) ABSTRACT

A lead line routing structure includes: a lead line having an elliptical section; a bracket having a routing surface; and a guide portion. The guide portion includes a holding wall portion having a first principal surface and a second principal surface. The holding wall portion is provided with: a lead-out hole for leading a lead line to the second principal surface; and a slit extending from an end of the holding wall portion to the lead-out hole. The width of the slit is set to be larger than the minor axis of the lead line and smaller than the major axis thereof.

9 Claims, 7 Drawing Sheets

SENSOR ATTACHMENT BRACKET AND LEAD LINE ROUTING STRUCTURE

TECHNICAL FIELD

The present invention relates to a sensor attachment bracket that attaches a foreign material detection sensor to an electric door of a vehicle and a lead line routing structure of the foreign material detection sensor.

BACKGROUND ART

In the prior art, a conventional electric door of a vehicle may include a foreign material detection sensor that detects entrapment of foreign material during a closing action (refer to, for example, Patent Document 1). The foreign material detection sensor is fixed to the vehicle body by a bracket, and a lead line, which is connected to the foreign material detection sensor to supply power, is routed on a routing surface of the bracket. The lead line, which is routed on the routing surface of the bracket, is bent, for example, at a right angle at a guide located at a predetermined position on the routing surface and spaced apart from the routing surface. The lead line, which extends and is spaced apart from the routing surface, is connected to a wiring harness or the like and electrically connected to an ECU.

PRIOR ART DOCUMENT

Patent Document

Patent Document 1: Japanese Laid-Open Patent Publication No. 2016-31924

SUMMARY OF THE INVENTION

Problems that the Invention is to Solve

At a bending position such as that described above where the lead line is spaced apart from the routing surface, the lead line is not stably held due to a bending reaction force. The inventors of the present invention have tried to find a solution to this problem and focused on the point that the lead wire has an elliptic cross section.

It is an object of the present invention to provide a sensor attachment bracket and a lead line routing structure that stably hold a lead line at a bending position where a lead line is spaced apart from a routing surface.

Means for Solving the Problems

In order to achieve the above object, a lead line routing structure includes a lead line that has an elliptic cross section; a bracket that includes a routing surface on which the lead line is routed; and a guide arranged on the routing surface to guide the lead line away from the routing surface. The guide includes a holding wall that includes a first main surface opposed to and spaced apart from the routing surface and a second main surface at a back side of the first main surface. The holding wall includes a guide hole, which extends through the holding wall from the first main surface to the second main surface to guide the lead line extending between the routing surface and the holding wall to the second main surface, and a slit, which extends from an end of the holding wall to the guide hole. The slit has a width set to be greater than a minor axis diameter of the lead line and less than a major axis diameter of the lead line.

MODES FOR CARRYING OUT THE INVENTION

One embodiment of a sensor attachment bracket and a lead line routing structure will now be described.

Figure 1:
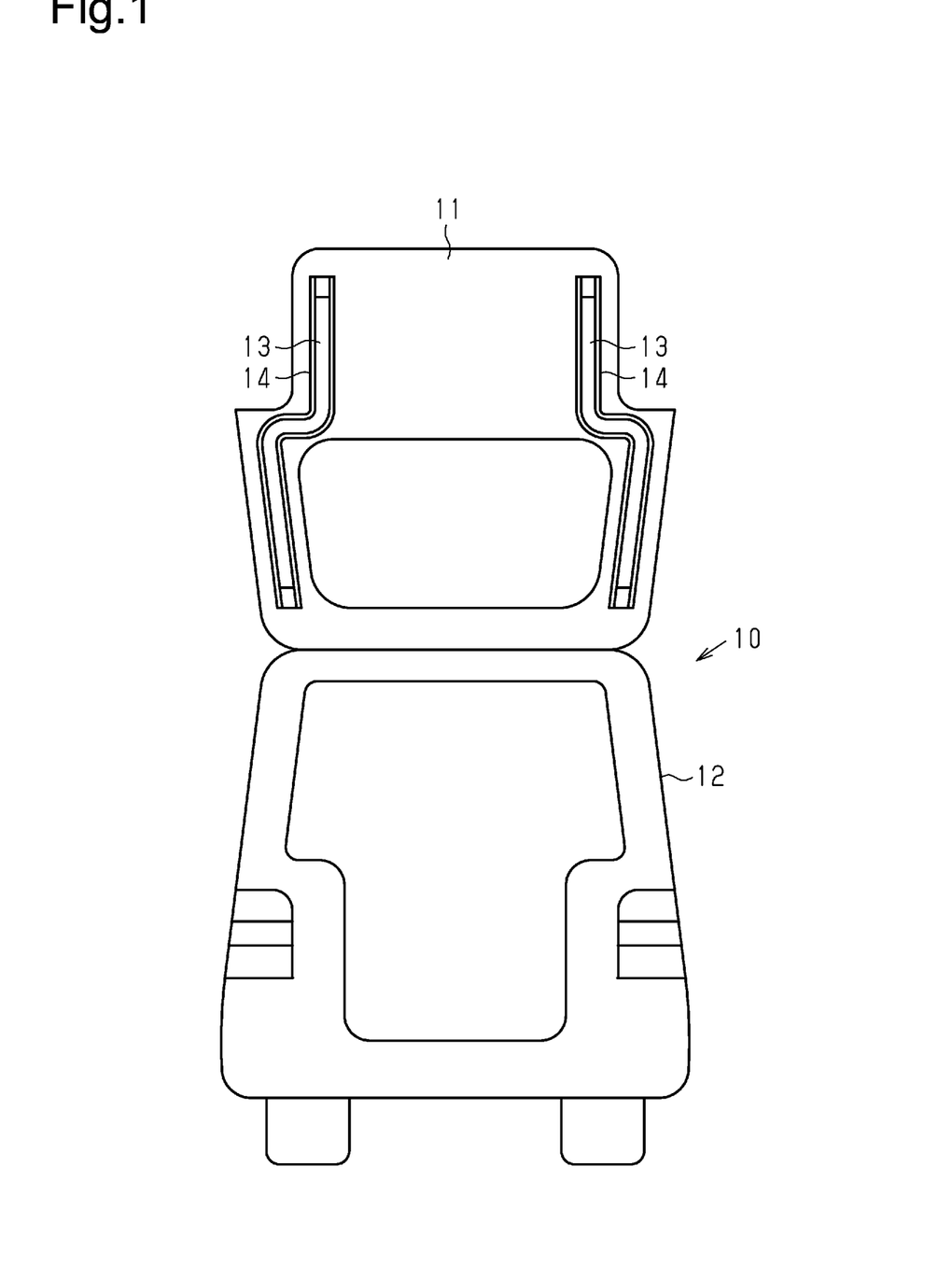
FIG. 1 is a schematic view of a vehicle in which a foreign material detection sensor according to one embodiment is installed.

A motor-driven rear door (motor-driven opening and closing body) 11 of a vehicle 10 shown in FIG. 1 includes two pressure-sensitive sensors (foreign material detection sensors) 13 to prevent entrapment of foreign material with a vehicle body 12 during a closing action. The pressure-sensitive sensors 13 are supported by two brackets 14 arranged along the ends of the rear door 11 in the vehicle widthwise direction. The brackets 14 are each made of synthetic plastic and injection molded. The brackets 14 are each elongated along the vehicle widthwise direction ends of the rear door 11.

Figure 2A:
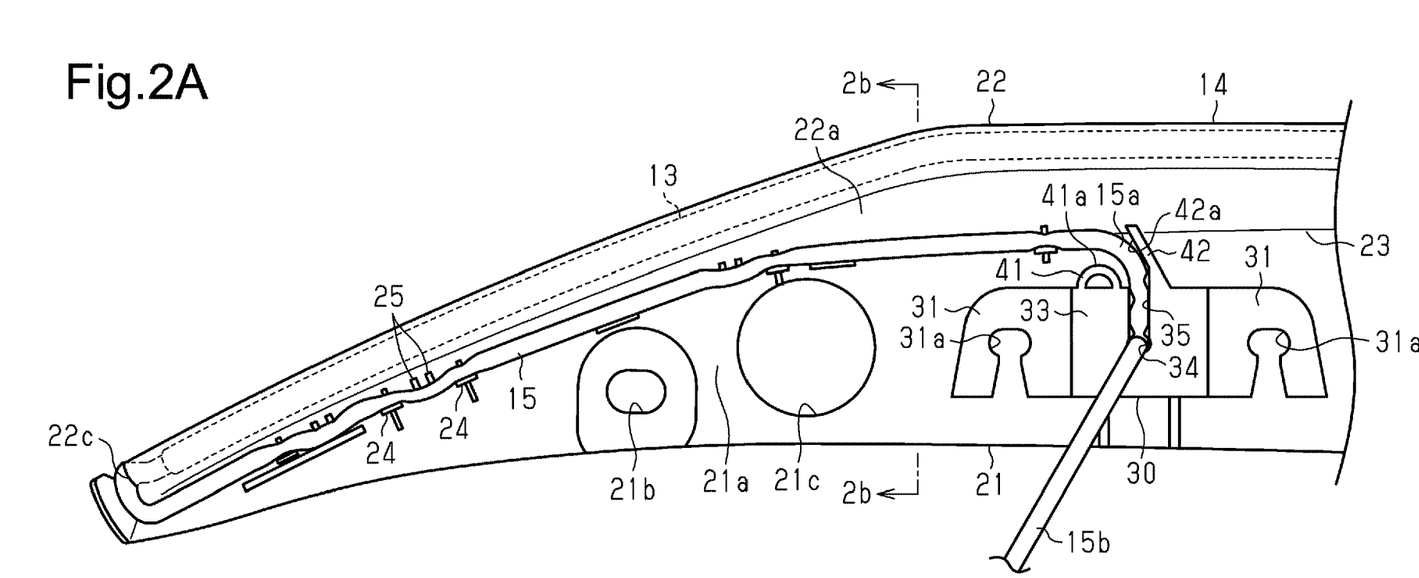
FIG. 2A is a plan view showing a portion of a bracket in FIG. 1 in which a lead line is routed.

The pressure-sensitive sensors 13 each include two electrode wires (not shown) spaced from each other inside a tubular insulator and are elongated along the vehicle widthwise direction ends of the rear door 11. Entrapment of foreign material is detected based on a change in electric resistance when the two electrode wires come into contact with each other (are short circuited) as a result of the entrapment of foreign material. One end of the pressure-sensitive sensor 13 is connected to a lead line 15 (see FIG. 2) that electrically connects the electrode wires to an ECU that controls a driving source (motor) for opening and closing the rear door 11.

Figure 8A:
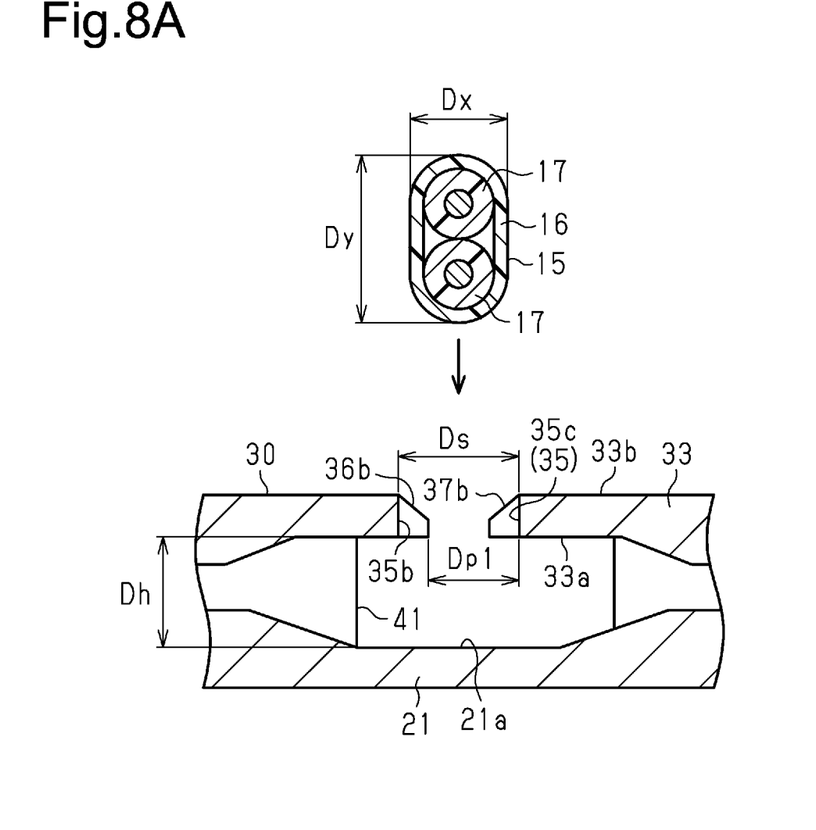
FIG. 8A is a cross-sectional view illustrating coupling of a lead line to the guide in FIG. 6.

As shown in FIG. 8A, the lead line 15 includes two sheathed wires 17 that are covered together with a sheath member 16, which is insulative and elastic. The lead line 15 has a cross section orthogonal to its axis that is an ellipse having a major axis diameter Dy in a direction in which the two sheathed wires 17 are arranged next to one another.

Figure 2B:
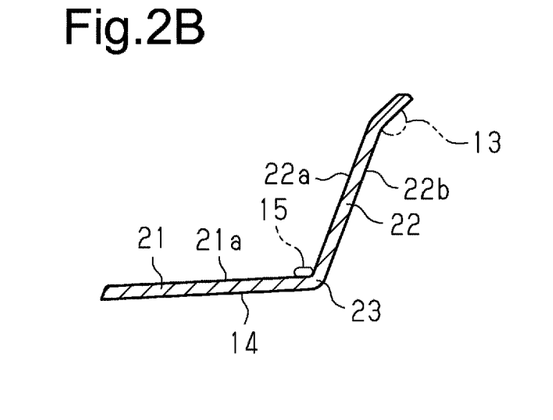
FIG. 2B is a cross-sectional view taken along line 2b-2b in FIG. 2A.

As shown in FIGS. 2A and 2B, the bracket 14 includes a first wall 21 having a routing surface 21a on which the lead line 15 is routed and a second wall 22 to which the pressure-sensitive sensor 13 is fixed. The first wall 21 and the second wall 22 configure a main portion of the bracket 14. The first wall 21 and the second wall 22 are both flat and intersect at a corner portion 23 where the angle is obtuse. The first wall 21 of the bracket 14 is fixed to the vehicle body (rear door 11).

As shown in FIG. 2B, among the front and rear surfaces of the second wall 22, the surface closer to the first wall 21 is referred to as an inner surface 22a and the rear surface is referred to as an outer surface 22b. The pressure-sensitive sensor 13 is fixed to the outer surface 22b of the second wall 22 in the longitudinal direction of the bracket 14.

As shown in FIG. 2A, the lead line 15 connected to one end of the pressure-sensitive sensor 13 is drawn out from the outer surface 22b to the inner surface 22a of the second wall 22 through a slit 22c formed in the second wall 22 near a longitudinal end.

The lead line 15 drawn out to the inner surface 22a of the second wall 22 is routed along the corner portion 23 on the routing surface 21a, which is the inner surface (surface near second wall 22) of the first wall 21. The lead line 15 is routed between the second wall 22 and a clip fitting hole 21b and bolt insertion hole 21c, which extend through the first wall 21. The clip fitting hole 21b serves as a hole into which a clip (not shown) that temporarily fixes the bracket 14 to the rear door 11 is fitted. The bolt insertion hole 21c serves as a hole into which a bolt (not shown) that fixes the bracket 14 to the rear door 11 is inserted. The lead line 15, which is routed along the corner portion 23, is bent at a substantially right angle in a direction extending away from the corner portion 23 (second wall 22) at a bending portion 15a, which is formed at a predetermined position, while remaining along the routing surface 21a.

The portion of the lead line 15 that is routed from a portion inserted through the slit 22c to the bending portion 15a along the corner portion 23 is held by a plurality of clamps 24 and a plurality of claws 25 formed integrally with the bracket 14.

Figure 3:
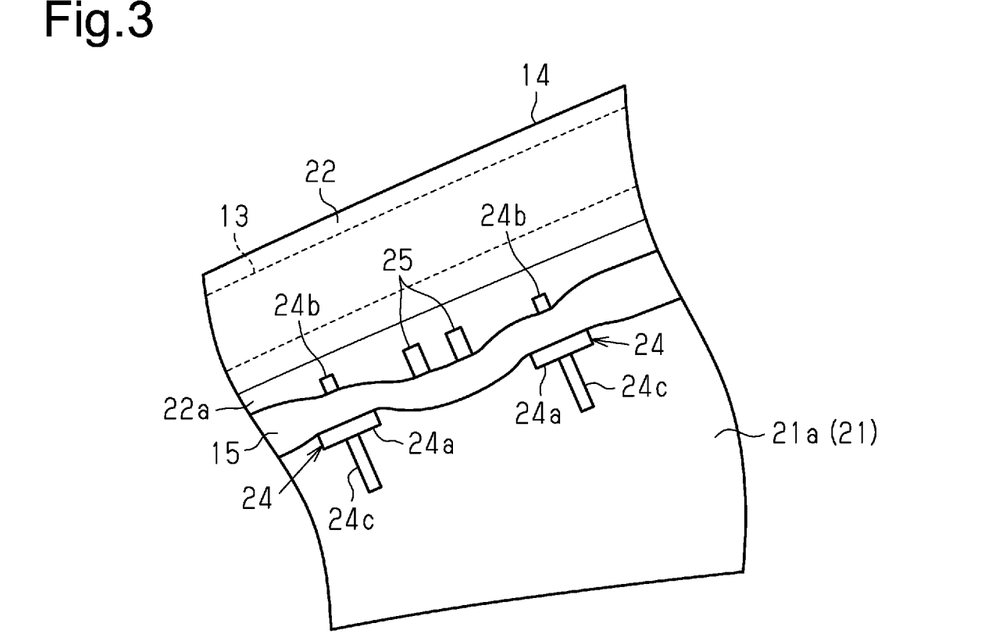
FIG. 3 is a partially enlarged plan view showing a lead line routing structure in FIG. 2A.
Figure 4:
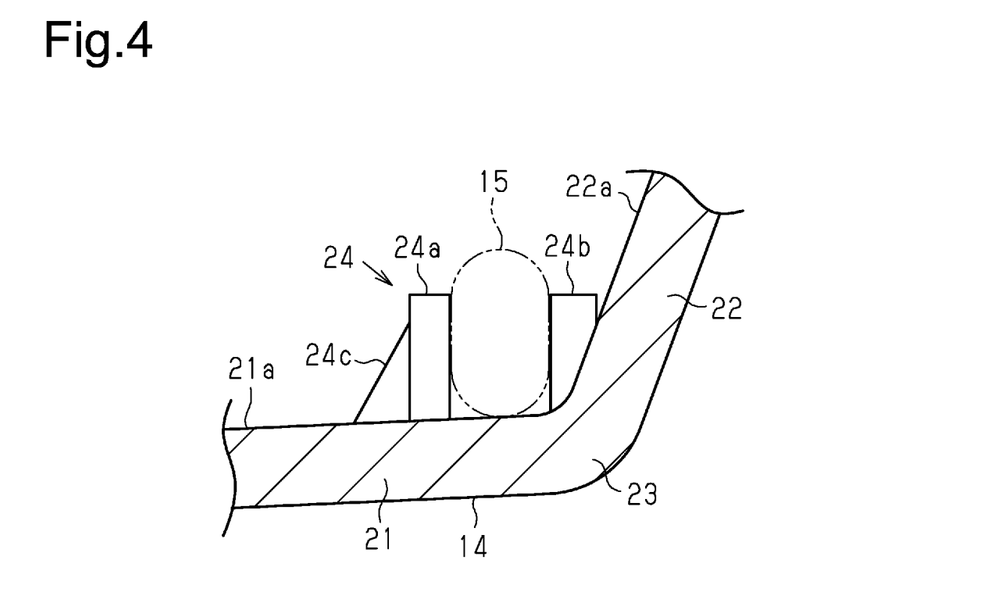
FIG. 4 is a schematic diagram of a portion of the lead line routing structure in FIG. 3.

As shown in FIGS. 3 and 4, the clamps 24 each include a holding wall 24a projecting from the routing surface 21a of the first wall 21 and a holding claw 24b projecting from the inner surface 22a of the second wall 22 and opposed to the holding wall 24a. A reinforcement rib 24c is formed on a back surface of the holding wall 24a. The lead line 15 is inserted in a compressed state between the holding wall 24a and the holding claw 24b and clamped by the holding wall 24a and the holding claw 24b. Two claws 25 projecting from the inner surface 22a of the second wall 22 are formed between the clamps 24. The claws 25 each press the lead line 15 in a direction extending away from the inner surface 22a of the second wall 22.

The lead line 15 is laid out in a manner meandered by the clamps 24 and the claws 25. This applies a reaction force to the clamps 24 and the claws 25 acting to return the lead line 15 to a straight shape thereby limiting separation of the lead line 15 from the clamps 24 and the claws 25.

As shown in FIG. 2A, the lead line 15 extends from the bending portion 15a to the vicinity of a central portion of the routing surface 21a in the widthwise direction (vertical direction in FIG. 2A) and is guided by a guide 30, which is integrally formed with the routing surface 21a at the vicinity of the central portion, in a direction extending away from the routing surface 21a. In other words, the lead line 15 is held by the guide 30 in a state bent at a substantially right angle in a direction extending away from the routing surface 21a (see FIG. 7). A covering member (not shown) such as a corrugated tube is fitted onto a drawn-out portion 15b (portion spaced apart from routing surface 21a) of the lead line 15 drawn out from the guide 30, and a connector (not shown) for connection to the ECU is arranged on a distal end of the drawn-out portion 15b. Two opposite sides of the guide 30 each include a clip attachment portion 31 having a notch 31a to which a clip (not shown) that temporarily fixes the bracket 14 to the rear door 11 is attached.

Figure 5:
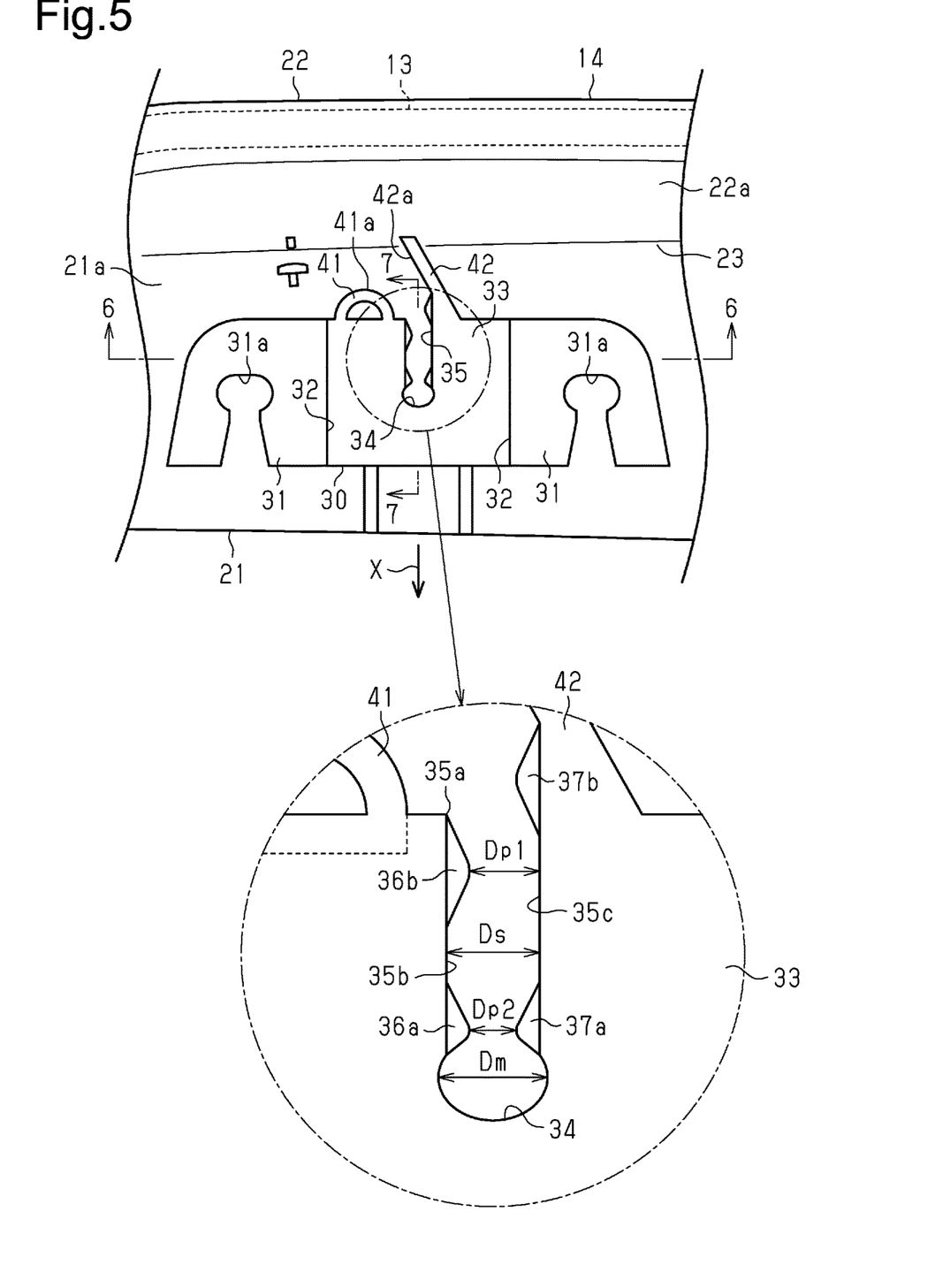
FIG. 5 is a plan view including an enlarged structure in the vicinity of a guide of the bracket in FIG. 2A.
Figure 6:
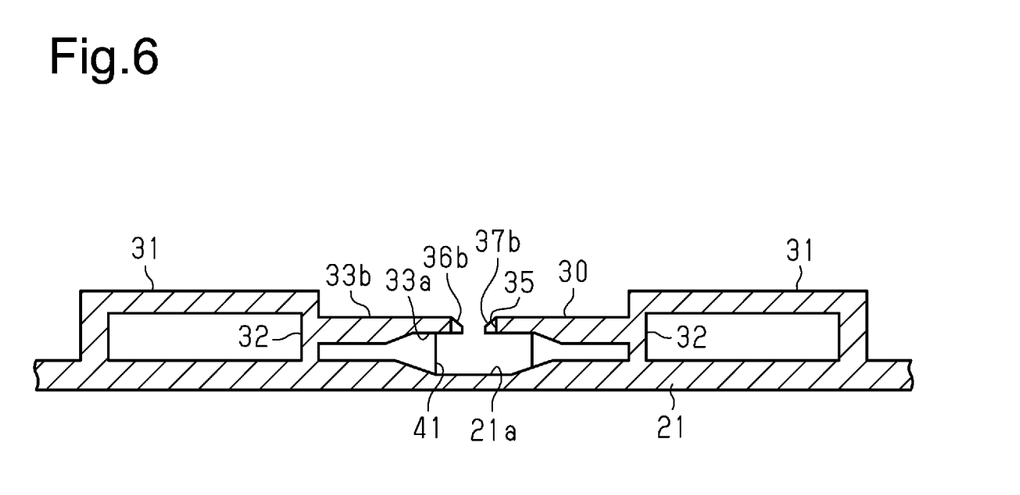
FIG. 6 is a cross-sectional view taken along line 6-6 in FIG. 5.
Figure 7:
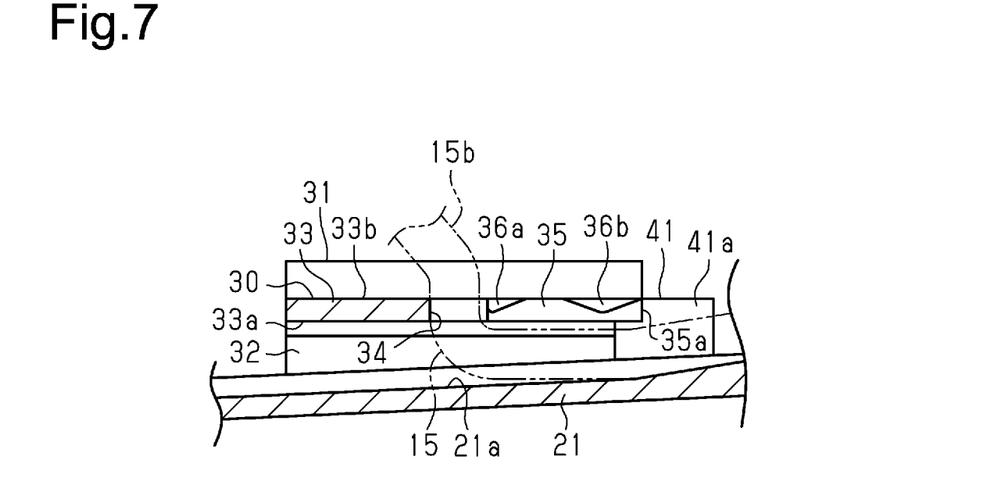
FIG. 7 is a cross-sectional view taken along line 7-7 in FIG. 5.

As shown in FIGS. 5, 6, and 7, the guide 30 includes two side walls 32 projecting from the routing surface 21a and a flat holding wall 33 bridging the two side walls 32. The side walls 32 are flat and extend in the widthwise direction (vertical direction in FIG. 5) of the routing surface 21a. The holding wall 33 includes a first main surface 33a that is spaced apart and opposed to the routing surface 21a and a second main surface 33b that is the back side of the first main surface 33a (see FIG. 6). A guide hole 34 extends through the holding wall 33 from the first main surface 33a to the second main surface 33b to guide the lead line 15, which is laid out between the routing surface 21a and the holding wall 33, to the second main surface 33b. The guide hole 34 has a cross section shaped to be an ellipse having a slightly larger diameter than the cross section of the lead line 15.

Further, the holding wall 33 includes a slit 35 extending straight from an end of the holding wall 33 located closer to the second wall 22 to the guide hole 34. That is, the slit 35 includes an open end 35a that is open toward the bending portion 15a of the lead line 15 at the end of the holding wall 33 located closer to the second wall 22. Further, the side of the slit 35 (non-open end) opposite to the open end 35a includes the guide hole 34. The slit 35 extends through the holding wall 33 in the height-wise direction (direction opposite to routing surface 21a) in the same manner as the guide hole 34. The lead line 15 is laid out through the slit 35 between the holding wall 33 and the routing surface 21a. The direction in which the slit 35 extends (longitudinal direction) is parallel to the direction in which the side walls 32 extend and corresponds to demolding direction X (see FIG. 5) when the bracket 14 is injection molded.

As shown in FIG. 5, the slit 35 includes a first side surface 35b and a second side surface 35c that are opposed to each other in the widthwise direction of the slit 35. The first side surface 35b and the second side surface 35c are parallel to each other. The first side surface 35b includes two projections 36a and 36b projecting inward in the widthwise direction of the slit 35. The second side surface 35c includes two projections 37a and 37b projecting inward in the widthwise direction of the slit 35. Among the two projections 36a and 36b and the two projections 37a and 37b, the projections 36a and 37a are located near the guide hole 34. The projections 36a, 36b, 37a, and 37b are formed to have a substantially triangular shape as viewed in the height-wise direction of the guide 30.

The projection 36a of the first side surface 35b and the projection 37a of the second side surface 35c are adjacent to the guide hole 34. The projection 36a and the projection 37a are arranged to be opposed to each other in the widthwise direction of the slit 35. Further, the projection 36b of the first side surface 35b and the projection 37b of the second side surface 35c are offset from each other in the direction in which the slit 35 extends (longitudinal direction). The projection 36b of the first side surface 35b is opposed to the second side surface 35c.

Dimensions in the widthwise direction of the slit 35 will now be described.

As shown in FIGS. 5 and 8A, the width of the slit 35, more specifically, distance Ds between the first side surface 35b and the second side surface 35c of the slit 35 is greater than minor axis diameter Dx of the lead line 15 and less than major axis diameter Dy of the lead line 15. Further, distance Dp1 between the vertex of the projection 36b of the first side surface 35b and the second side surface 35c is less than minor axis diameter Dx of the lead line 15. Distance Dp2 between the vertexes of the projections 36a and 37a, which are opposed to each other in the widthwise direction of the slit 35, is less than minor axis diameter Dx of the lead line 15. Major axis diameter Dm of the guide hole 34 is parallel to the widthwise direction of the slit 35, and major axis diameter Dm is greater than the width of the slit 35 (distance Ds) (see FIG. 5).

As shown in FIGS. 6 and 8A, the first main surface 33a of the holding wall 33 and the routing surface 21a, which is opposed to the first main surface 33a, are formed so that the gap in between is enlarged in the vicinity of the slit 35. Distance Dh between the first main surface 33a and the routing surface 21a in the enlarged gap is set to be greater than minor axis diameter Dx of the lead line 15 and less than major axis diameter Dy of the lead line 15. In the present embodiment, distance Dh is set to be slightly less than the width of the slit 35 (distance Ds).

As shown in FIG. 2A, the bracket 14 includes a first guide wall 41 and a second guide wall 42 projecting from the guide 30 toward the second wall 22. The first guide wall 41 and the second guide wall 42 are integrally continuous with the routing surface 21a. The first guide wall 41 is arranged at an inner side of the bending of the bending portion 15a of the lead line 15. The first guide wall 41 includes a curved guide surface 41a extending substantially in conformance with the bent shape of the bending portion 15a at a side opposed to the bending portion 15a. A portion of the first guide wall 41 is formed to be located between the first main surface 33a of the holding wall 33 and the routing surface 21a. Further, the second guide wall 42 is arranged at an outer side of the bending of the bending portion 15a of the lead line 15. The second guide wall 42 includes a guide surface 42a extending substantially in conformance with the bent of the bending portion 15a at a side opposed to the bending portion 15a. The second guide wall 42 projects from the guide 30 toward the second wall 22 and extends to the inner surface 22a of the second wall 22. The bending portion 15a of the lead line 15 is routed between the guide surface 41a of the first guide wall 41 and the guide surface 42a of the second guide wall 42.

The routing of the lead line 15 on the bracket 14 of the present embodiment will now be described with reference to operation.

The lead line 15 drawn out from the slit 22c of the second wall 22 is fitted to the clamps 24 and the claws 25 and routed along the corner portion 23 of the bracket 14. The lead line 15 is bent inward in the widthwise direction of the routing surface 21a (downward in FIG. 2A) (refer to bending portion 15a) at a substantially right angle along the guide surface 41a of the first guide wall 41 or the guide surface 42a of the second guide wall 42.

The lead line 15 is fitted into the slit 35 of the guide 30 from the second main surface 33b of the holding wall 33 to arrange the lead line 15 between the holding wall 33 and the routing surface 21a.

The direction of minor axis diameter Dx of the lead line 15 is matched with the widthwise direction of the slit 35 (sideward direction in FIG. 8) as shown in FIG. 8A to insert the lead line 15 into the slit 35. In the slit 35, distance Dp1 between the projection 36b and the second side surface 35c and distance Dp2 between the projections 36a and 37a are slightly less than minor axis diameter Dx of the lead line 15. This allows one to insert the lead line 15 into the slit 35 by lightly pressing the lead line 15 into the slit 35.

Figure 8B:
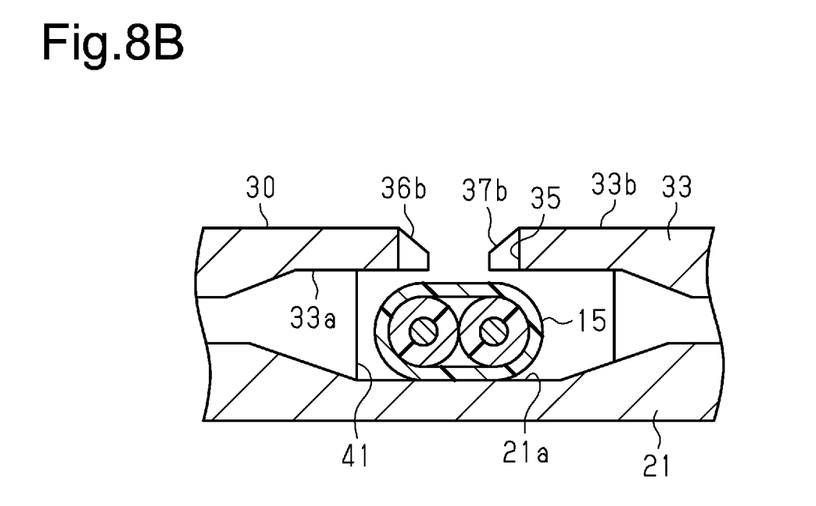
FIG. 8B is a cross-sectional view illustrating coupling of the lead line to the guide in FIG. 6.

The lead line 15 is then rotated so that major axis diameter Dy of the lead line 15 extends in the widthwise direction of the slit 35 as shown in FIG. 8B, and the lead line 15 is arranged between the holding wall 33 and the routing surface 21a. The lead line 15 is arranged in this direction between the holding wall 33 and the routing surface 21a to restrict separation of the lead line 15 from the slit 35 toward the second main surface 33b thereby keeping the lead line 15 between the holding wall 33 and the routing surface 21a.

As shown in FIGS. 2A and 7, when arranging the lead line 15 between the holding wall 33 and the routing surface 21a, the lead line 15 is arranged inside the guide hole 34. In this case, the lead line 15 is bent beneath the guide hole 34 thereby changing the layout direction of the lead line 15 to extend away from the routing surface 21a at the bending position. The lead line 15 is drawn out from the guide hole 34 to the second main surface 33b.

A seal sponge (not shown) into which the lead line 15 is inserted may be fixed to the second main surface 33b of the holding wall 33 at a portion where the lead line 15 is drawn out from the guide hole 34. This further stably fixes the lead line 15 to the guide 30. Preferably, the area (attachment area) of the seal sponge is the same as the area of the second main surface 33b of the holding wall 33.

The advantages of the present embodiment will now be described.

(1) Distance Ds of the slit 35 of the holding wall 33 in the widthwise direction is set to be greater than minor axis diameter Dx of the lead line 15 and less than major axis diameter Dy of the lead line 15. Thus, when the direction of minor axis diameter Dx of the lead line 15 is matched with the widthwise direction of the slit 35, the lead line 15 is routed between the holding wall 33 and the routing surface 21a through the slit 35, and the lead line 15 is drawn out of the guide hole 34 in a direction extending away from the routing surface 21a. After the lead line 15 is routed between the holding wall 33 and the routing surface 21a through the slit 35, the lead line 15 is rotated so that major axis diameter Dy of the lead line 15 extends in the widthwise direction of the slit 35, thereby keeping the lead line 15 between the holding wall 33 and the routing surface 21a. This stably fixes the lead line 15 at the bending position where the lead line 15 is spaced apart from the routing surface 21a.

(2) The slit 35 includes the first side surface 35b and second side surface 35c opposed to each other in the widthwise direction, the projections 36a and 36b projecting from the first side surface 35b toward the second side surface 35c, and the projection 37a projecting from the second side surface 35c toward the first side surface 35b. The widths of the slit 35 at the portions where the projection 36a, 36b, and 37a are located, namely, distances Dp1 and Dp2 are set to be less than minor axis diameter Dx of the lead line 15. This further restricts separation of the lead line 15 from the slit 35 toward the second main surface 33b and further stably keeps the lead line 15 between the holding wall 33 and the routing surface 21a.

If the range occupied by portions where the width is less than minor axis diameter Dx of the lead line 15 of the slit 35 in the longitudinal direction is too large, the lead line 15 cannot be easily fitted into the slit 35. Thus, the portions of the slit 35 of which widths are greater than minor axis diameter Dx of the lead line 15 are preferably set to be greater than or equal to one-half of the slit 35 in the longitudinal direction.

(3) The guide 30 includes the first guide wall 41 and the second guide wall 42 that guide the lead line 15 to the open end 35a of the slit 35 in the longitudinal direction. Thus, the first guide wall 41 and the second guide wall 42 guide and allow for easy fitting of the lead line 15 into the slit 35.

The above embodiment may be modified as described below.

In the above embodiment, the configuration such as the shape, number, or arrangement of the projections 36a, 36b, 37a, and 37b of the slit 35 may be changed in accordance with the configuration of the lead line 15 or the like.

Figure 9:
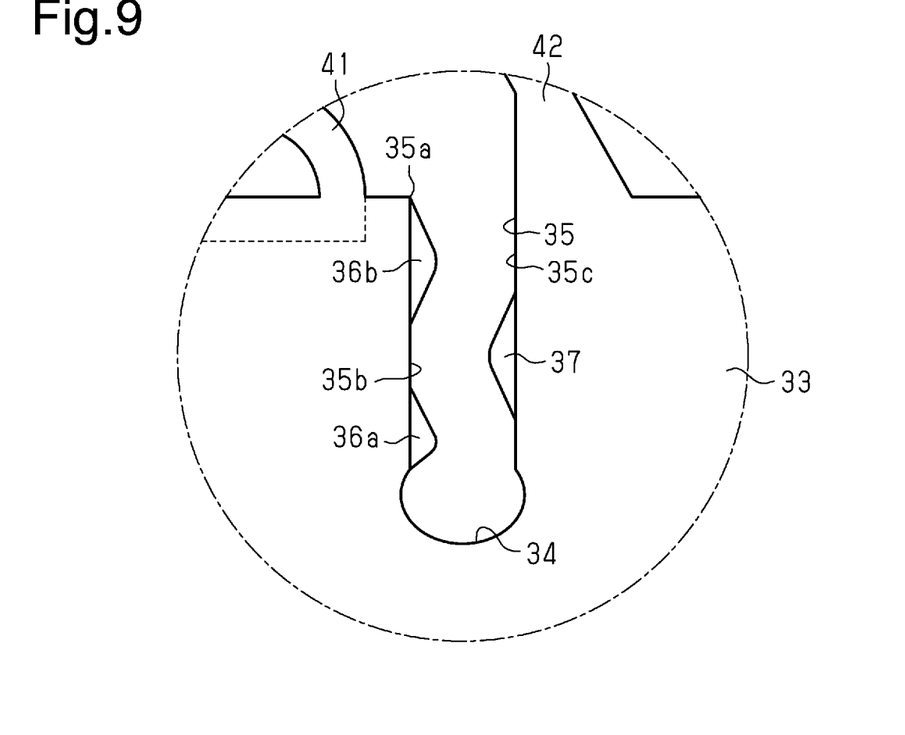
FIG. 9 is an enlarged plan view showing a slit of a modification.

In an example shown in FIG. 9, the number of projections 37 arranged on the second side surface 35c of the slit 35 is one. Further, the projection 37 is arranged at a position opposed to a portion between the projections 36a and 36b of the first side surface 35b. In this manner, the vertexes of the projections 36a and 36b of the first side surface 35b and the vertex of the projection 37 of the second side surface 35c are configured not to be opposed to each other in the widthwise direction of the slit 35. This allows for easy fitting of the lead line 15 into the slit 35.

Figure 10:
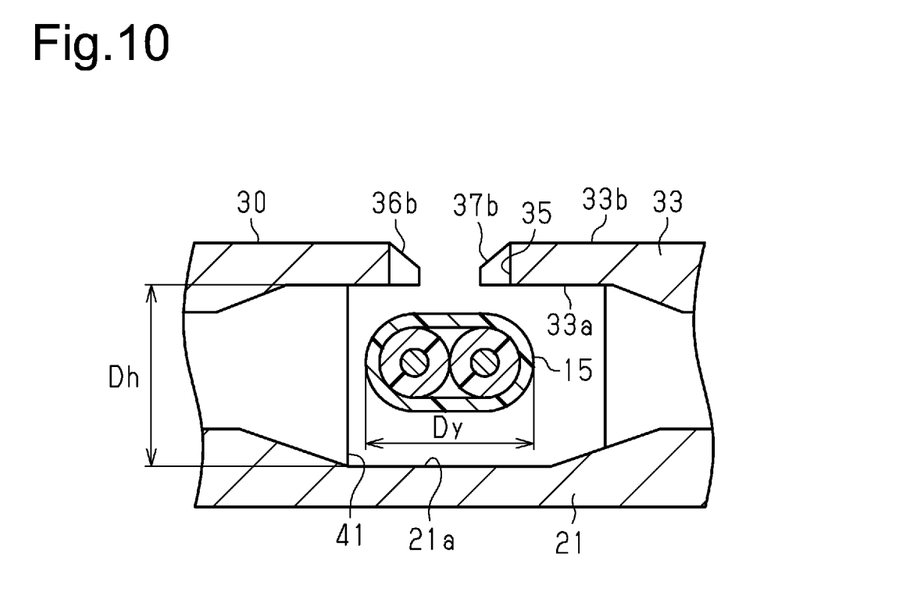
FIG. 10 is a cross-sectional view showing a guide of the modification.

In the above embodiment, distance Dh between the routing surface 21a and the first main surface 33a of the holding wall 33 is set to be less than major axis diameter Dy of the lead line 15. Instead, as shown in FIG. 10 for example, distance Dh between the routing surface 21a and the first main surface 33a may be set to be greater than major axis diameter Dy of the lead line 15. This configuration allows for each rotation of the lead line 15 so that major axis diameter Dy extends in the widthwise direction of the slit 35 after the lead line 15 is arranged between the holding wall 33 and the routing surface 21a through the slit 35.

If distance Dh between the routing surface 21a and the first main surface 33a is set to be greater than minor axis diameter Dx of the lead line 15, the first main surface 33a of the holding wall 33 and the routing surface 21a opposed to the first main surface 33a do not necessarily need to be configured to enlarge the gap near the slit 35.

The configuration of the guide 30 in the above embodiment may be changed in accordance with the layout direction of the lead line 15. For example, one of or both of the first guide wall 41 and the second guide wall 42 may be removed from the guide 30 in the above embodiment.

The configuration and the layout direction of the lead line 15 in the above embodiment may be changed in accordance with the configuration of the pressure-sensitive sensor 13. For example, the lead line 15 may include three or more sheathed wires 17.

The configuration such as the shape of the bracket 14 in the above embodiment is described as an example and may be changed in accordance with the layout of the pressure-sensitive sensor 13 and the lead line 15.

In the above embodiment, the pressure-sensitive sensor 13 including two electrode wires is described as an example of a foreign material detection sensor. Instead, a foreign material detection sensor other than the pressure-sensitive sensor may be used.

In the above embodiment, the present invention is applied to the lead line 15 of the pressure-sensitive sensor 13 in the rear door 11. Instead, the present invention may be applied to a lead line of a pressure-sensitive sensor in motor-driven sliding doors in the right and left sides of a vehicle.

The above embodiment and modifications may be combined.

The invention claimed is:

1. A lead line routing structure comprising:
 a lead line that has an elliptic cross section;
 a bracket that includes a routing surface on which the lead line is routed; and
 a guide arranged on the routing surface to guide the lead line away from the routing surface, wherein
 the guide includes a holding wall that includes a first main surface opposed to and spaced apart from the routing surface and a second main surface at a back side of the first main surface,
 the holding wall includes a guide hole, which extends through the holding wall from the first main surface to the second main surface to guide the lead line extending between the routing surface and the holding wall to the second main surface, and a slit, which extends from an end of the holding wall to the guide hole, and
 the slit has a width set to be greater than a minor axis diameter of the lead line and less than a major axis diameter of the lead line.

2. The lead line routing structure according to claim 1, wherein
 the slit includes a projection that projects from a side surface of the slit in a widthwise direction, and
 the width of the slit from where the projection projects is set to be less than the minor axis diameter of the lead line.

3. The lead line routing structure according to claim 1, wherein the guide includes a guide wall that guides the lead line to an open end of the slit in a longitudinal direction.

4. The lead line routing structure according to claim 1, wherein a distance between the routing surface and the first main surface is set to be greater than the major axis diameter of the lead line.

5. The lead line routing structure according to claim 1, wherein the lead line is connected to a foreign material detection sensor that detects entrapment of foreign material in a motor-driven opening and closing body of a vehicle.

6. A sensor attachment bracket supporting a foreign material detection sensor that detects entrapment of foreign material in a motor-driven opening and closing body of a vehicle, wherein a lead line that has an elliptic cross section and is connected to the foreign material detection sensor is routed on the sensor attachment bracket, the sensor attachment bracket comprising:
 a routing surface on which the lead line is routed; and
 a guide arranged on the routing surface to guide the lead line away from the routing surface, wherein
 the guide includes a holding wall that includes a first main surface opposed to and spaced apart from the routing surface and a second main surface at a back side of the first main surface,
 the holding wall includes a guide hole, which extends through the holding wall from the first main surface to the second main surface to guide the lead line extending between the routing surface and the holding wall to the second main surface, and a slit, which extends from an end of the holding wall to the guide hole, and
 the slit has a width set to be greater than a minor axis diameter of the lead line and less than a major axis diameter of the lead line.

7. The sensor attachment bracket according to claim 6, wherein
 the slit includes a projection that projects from a side surface of the slit in a widthwise direction, and the width of the slit from where the projection projects is set to be less than the minor axis diameter of the lead line.

8. The sensor attachment bracket according to claim 6, wherein the guide includes a guide wall that guides the lead line to an open end of the slit in a longitudinal direction.

9. The sensor attachment bracket according to claim 6, wherein a distance between the routing surface and the first main surface is set to be greater than the major axis diameter of the lead line.

* * * * *